(12) United States Patent
Lee et al.

(10) Patent No.: US 8,339,050 B2
(45) Date of Patent: Dec. 25, 2012

(54) LIGHT EMITTING DIODE DRIVING CIRCUIT AND LIGHT EMITTING DIODE ARRAY DEVICE

(75) Inventors: Young Jin Lee, Seoul (KR); Byoung Own Min, Gyunggi-do (KR); Gil Han Park, Gyunggi-do (KR); Grigory Onushkin, Gyunggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 0 days.

(21) Appl. No.: 13/209,122

(22) Filed: Aug. 12, 2011

(65) Prior Publication Data

US 2011/0298382 A1 Dec. 8, 2011

Related U.S. Application Data

(62) Division of application No. 12/213,506, filed on Jun. 20, 2008, now Pat. No. 8,026,675.

(30) Foreign Application Priority Data

Jun. 22, 2007 (KR) .................. 10-2007-0061593

(51) Int. Cl.
 *H05B 37/00* (2006.01)
(52) U.S. Cl. ............... 315/192; 315/185 R; 315/185 S; 315/187; 315/200 A; 315/312; 362/800; 362/84; 362/85
(58) Field of Classification Search ............. 315/185 S, 315/187, 200 A, 312–326, 192; 362/800–812, 362/85, 86, 95, 84
See application file for complete search history.

(56) References Cited

U.S. PATENT DOCUMENTS

| | | | |
|---|---|---|---|
| 5,467,049 A * | 11/1995 | Kida et al. | 327/438 |
| 7,045,965 B2 | 5/2006 | Li et al. | |
| 7,544,524 B2 | 6/2009 | Lin et al. | |
| 2006/0044864 A1* | 3/2006 | Lin et al. | 365/151 |
| 2006/0071806 A1 | 4/2006 | Hollnberger et al. | |
| 2006/0138971 A1 | 6/2006 | Uang et al. | |

(Continued)

FOREIGN PATENT DOCUMENTS

DE 101 03 422 A1 8/2002

(Continued)

OTHER PUBLICATIONS

Chinese Office Action, with English Translation, issued in Chinese Patent Application No. 200810100496.4, dated Dec. 31, 2010.

(Continued)

*Primary Examiner* — Douglas W Owens
*Assistant Examiner* — Thai Pham
(74) *Attorney, Agent, or Firm* — McDermott Will & Emery LLP

(57) ABSTRACT

There is provided an LED driving circuit including: at least one ladder network circuit including: (n+1) number of first branches connected in parallel with one another by n number of first middle junction points between a first junction point and a second junction point, where n denotes an integer satisfying $n \geq 2$, (n+1) number of second branches connected in parallel with one another by n number of second middle junction points between the first junction point and the second junction point, the (n+1) number of second branches connected in parallel with the first branches; and n number of middle branches connecting the first and second middle junction points of an identical m sequence to each other, respectively, wherein each of the first and second, and middle branches comprises at least one LED device.

5 Claims, 5 Drawing Sheets

U.S. PATENT DOCUMENTS

| | | | |
|---|---|---|---|
| 2006/0256826 A1* | 11/2006 | Lin et al. | 372/43.01 |
| 2007/0063657 A1 | 3/2007 | Wu | |
| 2007/0069663 A1 | 3/2007 | Burdalski et al. | |
| 2008/0211421 A1* | 9/2008 | Lee et al. | 315/250 |
| 2009/0009100 A1 | 1/2009 | Rooymans | |
| 2009/0174337 A1* | 7/2009 | Miskin et al. | 315/250 |

FOREIGN PATENT DOCUMENTS

| | | |
|---|---|---|
| EP | 1 675 440 A2 | 6/2006 |
| JP | 63-064059 | 4/1988 |
| JP | 05-198843 | 8/1993 |
| JP | 2001-524249 | 11/2001 |
| JP | 2004-006582 | 1/2004 |
| JP | 2006-073979 | 3/2006 |
| JP | 2006-221940 | 8/2006 |
| JP | 2006-319333 | 11/2006 |
| JP | 2007-123609 | 5/2007 |
| KR | 10-2006-0020572 A | 3/2006 |
| WO | WO 2006/085767 A2 | 8/2006 |
| WO | WO 2007/052241 A2 | 5/2007 |

OTHER PUBLICATIONS

European Search Report issued in European Patent Application No. 08252161.8-2206, mailed Dec. 18, 2009.

Japanese Office Action, with English translation, issued in Japanese Patent Application No. 2008-162519, mailed Apr. 5, 2011.

* cited by examiner

LIGHT EMITTING DIODE DRIVING CIRCUIT AND LIGHT EMITTING DIODE ARRAY DEVICE

CROSS-REFERENCE TO RELATED APPLICATIONS

This application is a Divisional of U.S. application Ser. No. 12/213,506, filed on Jun. 20, 2008 now U.S. Pat. No. 8,026,675, which claims the priority of Korean Patent Application No. 2007-61593 filed on Jun. 22, 2007, in the Korean Intellectual Property Office, the disclosures of each of which are incorporated herein by reference.

BACKGROUND OF THE INVENTION

1. Field of the Invention

The present invention relates to a light emitting diode (LED) circuit, and more particularly, to an LED driving circuit directly applicable to an alternating current (AC) power without requiring a converter for converting the AC into a direct current (DC), and an LED array apparatus.

2. Description of the Related Art

A semiconductor light emitting diode (LED) is advantageous as a light source in terms of output, efficiency or reliability. Thus, the LED is actively researched and developed as a high-output and high efficiency light source to substitute a backlight of a lighting device or a display device.

In general, the LED is driven in a low driving current (DC). Therefore, to be driven at a normal voltage, i.e. alternating current (AC) of 220V, the LED requires an additional circuit, e.g., AC/DC converter for supplying a low DC output voltage. However, such an additional circuit complicates configuration of an LED module and furthermore potentially undermines efficiency and reliability when a supply power source is converted. Moreover, the additional part other than the light source increases costs and size of the product and also degrades electromagnetic interference (EMI) characteristics due to a periodic component when operating in the switching mode.

To overcome this problem, various types of LED driving circuits capable of being driven without an additional converter have been suggested. However, in a conventional AC-driven LED driving circuit, most LEDs are arranged to be driven in a specific half cycle of the AC voltage, thereby increasing the number of LEDs required for achieving desired light amount.

The necessary number of LEDs may be varied according to arrangement of the LEDs even though identical light amount is supplied. But the conventional arrangement of LEDs ensures very low efficiency. For example, in a conventional representative example where the LEDs are arranged in a reverse parallel or bridge configuration, the actual numbers of LEDs continuously emitted represent merely 50% and 60% of total numbers of LEDs, respectively. That is, a greater number of LEDs are inefficiently required to attain desired emission.

Therefore, the LEDs may be more efficiently arranged to assure identical light amount through a smaller number of LEDs. This arrangement with greater efficiency is of significant importance to assure cost efficiency of the AC-driven LED circuit.

SUMMARY OF THE INVENTION

An aspect of the present invention provides a novel light emitting diode (LED) driving circuit which requires a minimum number of LEDs while directly employing an alternate current (AC) voltage.

An aspect of the present invention also provides an LED array apparatus including the LED driving circuit.

According to an aspect of the present invention, there is provided an LED driving circuit including: at least one ladder network circuit including: (n+1) number of first branches connected in parallel with one another by n number of first middle junction points between a first junction point and a second junction point, where n denotes an integer satisfying n≧2, (n+1) number of second branches connected in parallel with one another by n number of second middle junction points between the first junction point and the second junction point, the (n+1) number of second branches connected in parallel with the first branches; and n number of middle branches connecting the first and second middle junction points of an identical m sequence to each other, respectively, wherein each of the first and second, and middle branches includes at least one LED device, and m is a positive integer defining sequences of the respective (n+1) first and second branches and the n number of middle branches with respect to the first junction point; a first current loop having a first group of LED devices located on (2m−1) sequence of the first branches, 2m sequence of the second branches and the n number of middle branches, respectively to be connected in series with one another and driven in a first half cycle of an alternating voltage applied between the first and second junction points; and a second current loop having a second group of LED devices located on 2m sequence of the first branches, (2m−1) sequence of the second branches and the n number of middle branches, respectively to be connected in series with one another and driven in a second half cycle of an alternating voltage between the first and second junction points.

The each of the first and second branches and middle branches may include one LED. Alternatively, at least one of the first, second and middle branches may include a plurality of LEDs connected in series to one another.

The first and second braches may include one LED, respectively, and the middle branches may include a plurality of LEDs connected in series to one another. Considering a reverse directional voltage, the middle branches may include one of two and three LEDs connected in series together.

The ladder network circuit may include a plurality of ladder network circuits connected in series to one another, wherein a second junction point of one of the ladder network circuits is in contact with a first junction point of another one of the ladder network circuits.

According to another aspect of the present invention, there is provided an LED array apparatus including a plurality of LEDs, the LED array having the LED driving circuit defined as described above.

According to still another aspect of the present invention, there is provided an LED array apparatus including: K number of first LEDs connected in a row by n number of first middle junction points between first and second junction points, each of the first middle junction points having electrodes of identical polarity connected thereto, where n is an integer satisfying n≧2 and K is an integer satisfying K≧3, wherein the electrodes connected to the first middle junction points have polarities arranged alternately from the first junction point, starting with a first polarity; L number of second LEDs connected in a row by n number of second middle junction points between the first and second junction points, each of the second middle junction points having electrodes of identical polarity connected thereto, where L is an integer satisfying L≧3, wherein the electrodes connected to the second middle junction points have polarities arranged alternately from the first junction point, starting with a second polarity; and M number of third LEDs connected between the first and second middle junction points each having an identical sequence from the first junction point, each of the third LEDs having an electrode connected to have an opposite polarity to a corresponding one of the electrodes of the first and second LEDs, where m is a positive integer defining sequence of the n number of first and second middle junction points with respect to the first point junction, and M is an integer satisfying M≧n.

The first and second LEDs may include (n+1) number of first and second emitting diodes, respectively, the first and second LEDs connected to identical polarity, respectively.

Each of the third light emitting diodes may be connected between the first and second middle junction points, respectively.

The plurality of third LEDs may be connected between the first and second middle junction points, respectively, and the third LEDs between the first and second middle junction points may be connected in one of series and parallel to one another.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
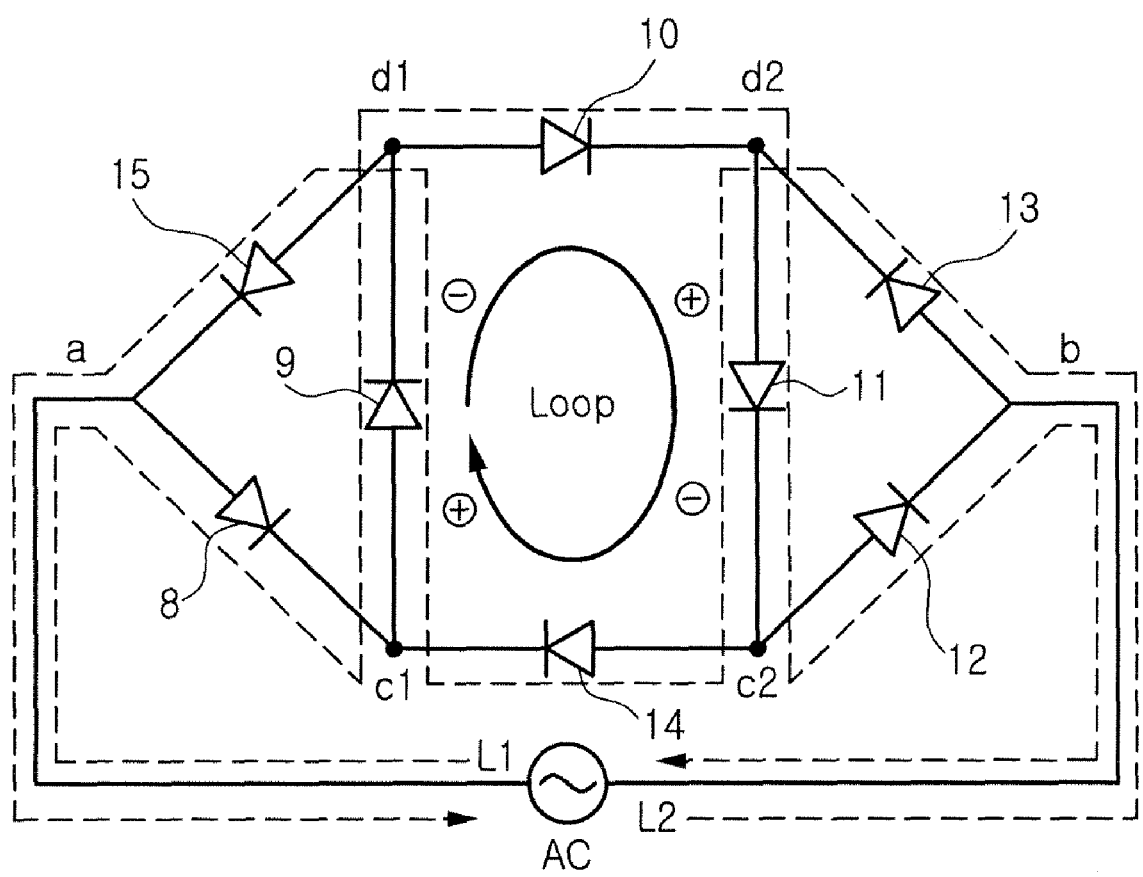
FIG. 1 illustrates a light emitting diode (LED) driving circuit according to an exemplary embodiment of the invention.

FIG. 1 illustrates a light emitting diode (LED) driving circuit according to an exemplary embodiment of the invention.

The LED driving circuit includes a ladder network LED circuit. That is, the ladder network LED circuit of the present embodiment includes three first branches connected to one another by first middle junction points c1 and c2 between first and second junction points a and b, and three second branches connected to one another by second middle junction points d1 and d2 between the first and second junction points a and b. The LED driving circuit includes two middle branches connected between the first and second middle junction points c1, d1, c2 and d2 of an identical sequence. Here, LED devices 8, 9, 10, 11, 12, 13, 14, and 15 are disposed on the first and second branches and the middle branches, respectively.

The LED driving circuit includes two current loops L1 and L2 to be driven in different half cycles of an alternating voltage. The first current loop L1 includes the LED devices 8, 9, 10, 11, and 12 connected in series to one another to be driven in a first half cycle of the alternating voltage. The second current loop L2 includes the LED devices 13, 11, 14, 9, and 15 connected in series to one another to be driven in a second half cycle of the alternating voltage. As described above, with the alternating voltage applied, the circuit can be operated such that the LED devices 9 and 11 are driven in a bi-direction.

The LEDs are arranged in the ladder network circuit as described below when the first and second branches and middle branches from the first junction point a have a sequence defined as m.

The LED devices 8, 9, 10, 11,12,13,14, and 15 may be divided into first and second LED groups according to a cycle of the drivable alternating current. The first LED group includes the LEDs 8, 9, 10, 11, and 12 belonging to the first branch of an odd number of (2m−1) sequence, all middle branches and the second branch of an even number of 2m sequence. The LEDs 8, 9, 10, 11, and 12 of the first LED group are connected in series to one another. The second LED group includes the LEDs 13,11,14,9, and 15 belonging to the first branch of an even number of 2m sequence, all middle branches and the second branch of an odd number of (2m−1) sequence. The second LED group is connected in series to one another to be reverse in polarity to the first LED group.

Therefore, the first LED group may form the first current loop L1 driven in the first half cycle of the alternating voltage and the second LED group may form the second current loop L2 driven in the second half cycle of the alternating voltage. In this driving configuration, the LED devices 9 and 11 located on the middle branches and commonly belonging to the first and second LED groups can be operated continuously over an entire cycle of the alternating voltage.

As described above, in the LED driving circuit including the eight LED devices 8, 9, 10, 11,12,13,14, and 15, the two LED devices 10 and 14 can be driven over the entire cycle of the alternating voltage. Therefore, in the actual ladder network, five LED devices may be provided to perform continuous emission. Here, a ratio of the number of driven LEDs to the number of employed LEDs is 62.5%. This figure is higher than in the case of the conventional AC-driven LED arrangement, for example, reverse polarity arrangement (50%) or bridge arrangement (60%).

The LED driving circuit of the present embodiment is significantly different from a bridge structure since the LED device 9 and the LED device 11 are connected to each other in series, not in parallel. That is, in the LED driving circuit of the present embodiment, the LED devices 10 and 14 are inserted to be connected in series with each other between the LED device 9 and the LED device 11. This produces a ladder network structure fundamentally different from the bridge structure.

In the LED driving circuit of the present embodiment, the LEDs driven in a bi-direction, i.e., over an entire cycle of the alternating voltage, are connected in series, not in parallel by inserting the LED devices 10 and 14 and connecting four middle junction points c1, c2, d1, and d2. This LED arrangement structurally forms one loop. In actual driving, as described above, the LEDs are different in potential difference in the loop formed of the middle junction points and thus operated in one serial configuration without forming a current loop.

According to another exemplary embodiment of the invention, in the ladder network structure shown in FIG. 1, a loop connecting the first and second middle junction points together may be provided as one stack and various LED driving circuits may be successively connected to one another by the plurality of stacks. That is, the first and second middle junction points may be configured in identical numbers of at least three, respectively. The first and second branches may be configured in identical numbers of four, respectively.

Figure 2C:
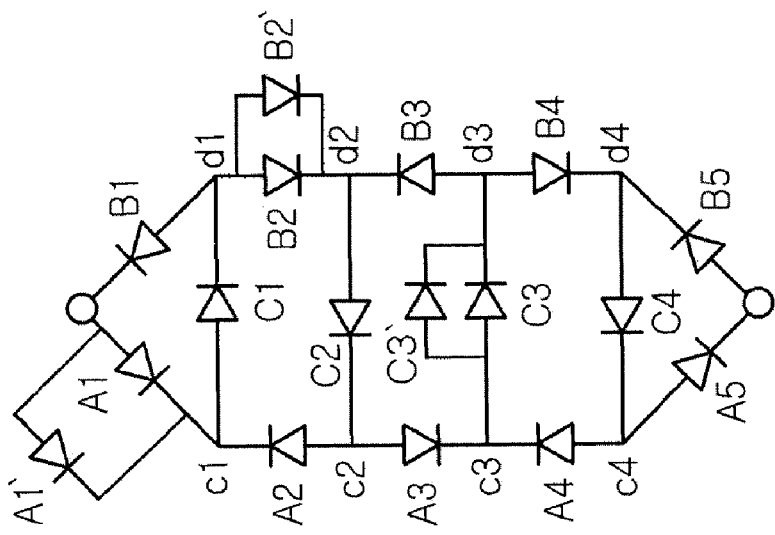
FIGS. 2A to 2C illustrate LED driving circuits according to another exemplary embodiment of the invention.
Figure 2B:
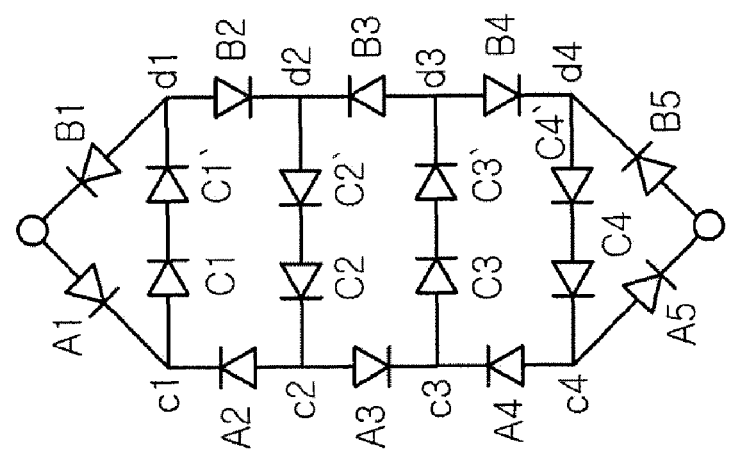
Figure 2A:
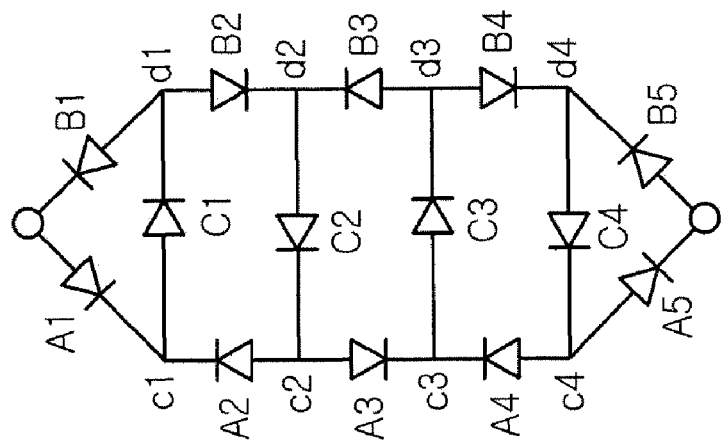

FIG. 2A illustrates an LED driving circuit having four first and second middle junction points c1,c2,c3,c4 and d1,d2,d3, d4, respectively according to another exemplary embodiment of the invention.

The LED driving circuit shown in FIG. 2A includes four middle branches connecting the first and second middle junction points of an identical sequence. This driving circuit may be understood as a ladder network circuit having three stacks.

Referring to FIG. 2A, each of the branches has one LED device disposed thereon. These LED devices are arranged to include first and second current loops driven in different half cycles of an alternating voltage. That is, in a first half cycle of the alternating voltage, corresponding ones of the LED devices are connected in series to one another to form the first current loop along A1-C1-B2-C2-A3-C3-B4-C4-A5. In a second half cycle of the alternating voltage, other corresponding ones of the LED devices are connected in series to one another to form the second current loop along B1-C1-A2-C2-B3-C3-A4-C4-B5.

In the LED driving circuit of the present embodiment, the four LED devices C1, C2, C3, and C4 located on the middle branches and commonly involved in the first and second current loops can be operated continuously over an entire cycle of the alternating voltage.

As described above, in the LED driving circuit including a total of fourteen LED devices, the four LED devices C1, C2, C3, and C4 can be driven over an entire cycle of the alternating voltage. This allows the nine LED devices to continuously emit light in the actual ladder network circuit. Here, the LED utilization efficiency is about 64%. In the present embodiment, a smaller number of LEDs can be utilized than in the previous embodiment.

In the driving circuit shown in FIGS. 1 and 2A, each of the first and second branches and middle branches is illustrated to include one LED device. Alternatively, the each of the first and second branches and middle branches may include the plurality of LED devices. However, even in this case, the plurality of LED devices belonging to the identical branch should be connected in series to one another.

Particularly, an increase in the number of the LEDs in the middle branches leads to a relative increase in the number of the LEDs driven in a bi-direction. This accordingly enhances light emitting efficiency for the LEDs employed. Consequently, this diminishes the number of the LEDs required for obtaining desired emission level.

The LED driving circuit shown in FIG. 2B is configured such that two LED devices are connected in series to each other on each of the middle branches in the LED driving circuit of FIG. 2A.

In the first half cycle of the alternating voltage, corresponding ones of the LED devices are connected in series to one another to form the first loop along A1-C1-C1'-B2-C2-C2'-A3-C3-C3'-B4-C4-C4'-A5. In the second half cycle of the alternating voltage, other corresponding ones of the LED devices are connected in series to one another to form the second current loop along B1-C1-C1'-A2-C2-C2'-B3-C3-C3'-A4-C4-C4'-B5.

In the LED driving circuit of the present embodiment, eight LED devices C1, C1', C2, C2', C3, C3', C4, C4' belong to the middle branches. That is, two times greater number of LED devices C1,C1',C2,C2',C3,C3',C4, and C4' are commonly involved in the first and second current loops to ensure continuous operation over an entire cycle of the alternating voltage compared to the LED driving circuit of FIG. 2A.

In consequence, in the LED driving circuit including a total of eighteen LED devices, the eight LED devices C1, C1', C2, C2', C3, C3', C4, and C4' can be driven over an entire cycle of the alternating voltage. Therefore, thirteen LED devices may continuously emit light in the actual ladder network circuit. Here, the utilization efficiency of the LEDs is about 72%. In the present embodiment, a much smaller number of LEDs are employed than in the previous embodiments.

An LED driving circuit shown in FIG. 2C is configured such that in the LED driving circuit shown in FIG. 2A, LED devices A1', B2', and C3' are disposed on a first branch of first sequence, a second branch of second sequence and a middle branch of third sequence, respectively to be connected in parallel to each other.

In the first half cycle of the alternating voltage, corresponding ones of the LED devices are connected in series to one another to form the first current loop along (A1, A1')-C1-(B2, B2')-C2-A3-(C3, C3')-B4-C4-A5. In the second half cycle of the alternating voltage, other corresponding LED devices are connected in series to one another to have the second current loop along B1-C1--A2-C2--B3-(C3,C3')-A4-C4-C4'-B5. However, devices in parentheses are connected in parallel with one another.

An increase in the LED devices located on the middle branches also leads to an increase in the number of devices driven in a bi-direction, thereby enhancing the utilization efficiency of the LEDs. However, only an increase in the number of the LED devices located on the middle branches results in an increase in a reverse directional voltage applied to the LED devices belonging to the first and second branches. Therefore, in a case where the LED devices are of an identical size, the number of the LEDs located on the middle branches may be two or three.

In a specific embodiment of the present invention, a plurality of the ladder network circuits are provided. Here, a second junction point of one of the ladder network circuits maybe connected in series with a first junction point of another ladder network circuit. This embodiment is shown in FIG. 3.

Figure 3:
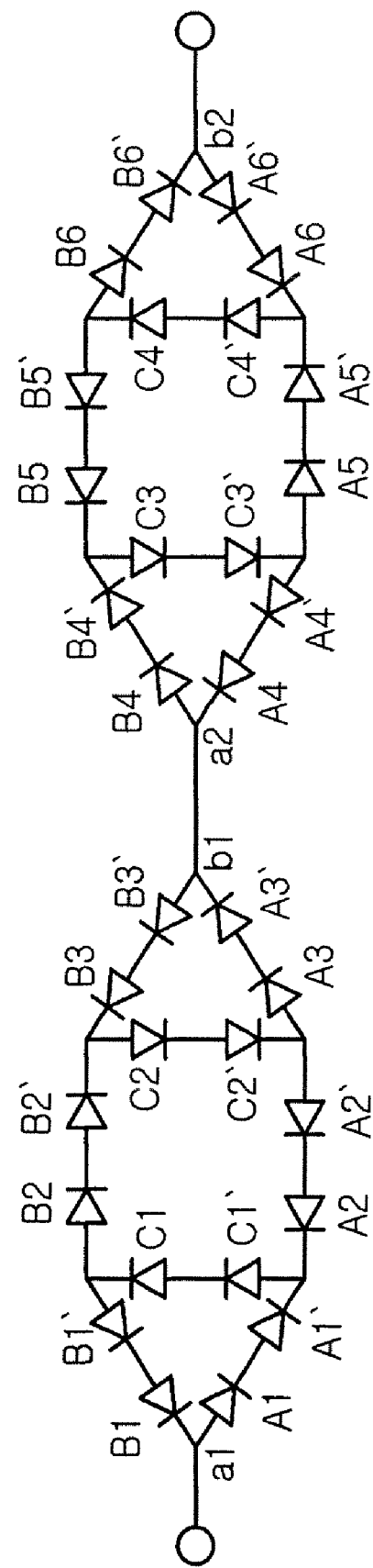
FIG. 3 illustrates an LED driving circuit according to still another exemplary embodiment of the invention.

Referring to FIG. 3, an LED driving circuit is structured such that two ladder network circuits are connected in series to each other. That is, a second junction point b1 of a first ladder network circuit is connected to a first junction point a2 of a second ladder network. Also, a first junction point a1 of the first ladder network circuit and a second junction point of the second ladder network are connected to an AC power terminal. Moreover, in the present embodiment, two LED devices are disposed on a first branch, a second branch and middle branches, respectively to be connected in series to each other.

In the LED driving circuit of FIG. 3, in a first half cycle of an alternating voltage, corresponding ones of the LED devices are connected in series to one another to form a first current loop along A1-A1'-C1-C1'-B2-B2'-C2-C2'-A3-A3' (hereinafter, first ladder network circuit)-B4-B4'-C3-C3'-A5-A5'-C4-C4'-B6-B6' (hereinafter, second ladder network circuit). In a second half cycle of the alternating voltage, other corresponding LED devices are connected in series to one another to have a second current loop along B1-B1'-C1-C1'-A2-A2'-C2-C2'-B3-B3' (hereinafter, first ladder network circuit)-A4-A4'-C3-C3'-B5-B5'-C4-C4'-A6-A6' (hereinafter, second ladder network circuit).

In the LED driving circuit of the present embodiment, eight LED devices C1, C1', C2, C2', C3, C3', C4, and C4' belong to the middle branches. That is, two times greater number of the LED devices C1,C1',C2,C2',C3,C3',C4, and C4 are commonly involved in the first and second current loops to ensure continuous operation over an entire cycle of the alternating voltage compared with the LED driving circuit of FIG. 2A.

As described above, the LEDs maybe arranged in various configurations to allow for AC driving of the ladder network structure according to the present embodiment.

According to an exemplary embodiment of the invention, there may be provided an LED array device having a plurality of LED devices including LED driving circuits of various ladder network structures.

That is, in the LED array apparatus of the present invention, K number of first LED devices are connected in a row by n number of first middle junction points between first and second junction points. Also, the first middle junction points each have electrodes of identical polarity connected thereto. The electrodes connected to the first middle junction points have polarities arranged alternately from the first junction point, starting with a first polarity. Here, K is an integer satisfying $K \geq 3$, and n is an integer satisfying $n \geq 2$. L number of second LED devices are connected in a row by n number of second middle junction points between the first and second junction points. Also, the second middle junction points each have electrodes of identical polarity connected thereto. The electrodes connected to the second middle junction points have polarities arranged alternately from the first junction point, starting with a second polarity. Here, L is an integer satisfying $L \geq 3$. Thus, the electrodes connected to the first and second middle junction points have opposite polarities to each other.

Furthermore, M number of third LED devices disposed on the middle branches of the circuit are connected between the first and second middle junction points each having an identical sequence from the first junction point. The third light emitting diodes each have an electrode connected to the first and second middle junction points of an identical m sequence to have an opposite polarity to a corresponding one of the electrodes of the first and second LEDs. Here, M is an integer satisfying $M \geq m$ and m is a positive integer defining a sequence of the first and second middle junction points from the first junction point.

Each of the first LED devices and each of the second LED devices may be located between the middle junction points, respectively. Similarly, each of the third LED devices may be located between the first and second middle junction points, respectively.

Optionally, the plurality of third LED devices may be connected between the first and second middle junction points. Here, the third LED devices may be connected in series or in parallel to one another (see FIG. 2B or 2C).

To explain effects of less LED numbers in the ladder network LED driving circuit of the present embodiment, a difference has been compared between the numbers of LEDs required in the ladder network LED driving circuit of the present embodiment and the numbers of LEDs required in the conventional AC driving LED circuit, e.g., bi-polar circuit and bridge network circuit in order to satisfy specific output conditions using identical LED devices.

Figure 4A:
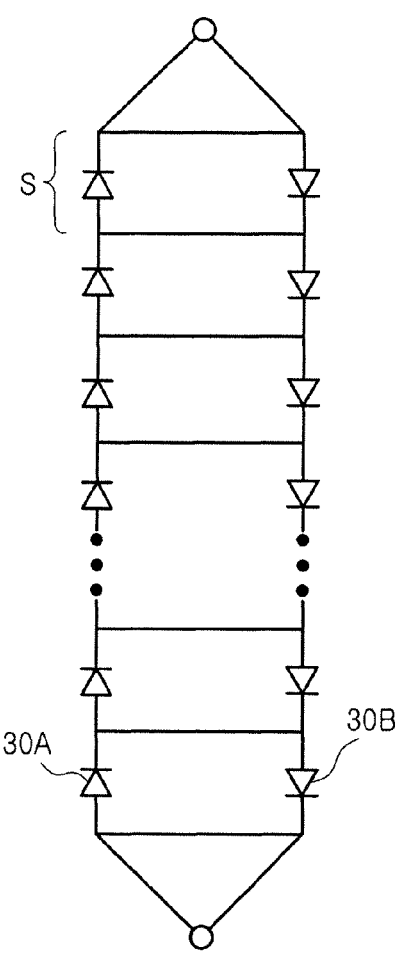
FIGS. 4A to 4C illustrate LED driving circuits according to a conventional example and according to an exemplary embodiment of the invention.
Figure 4B:
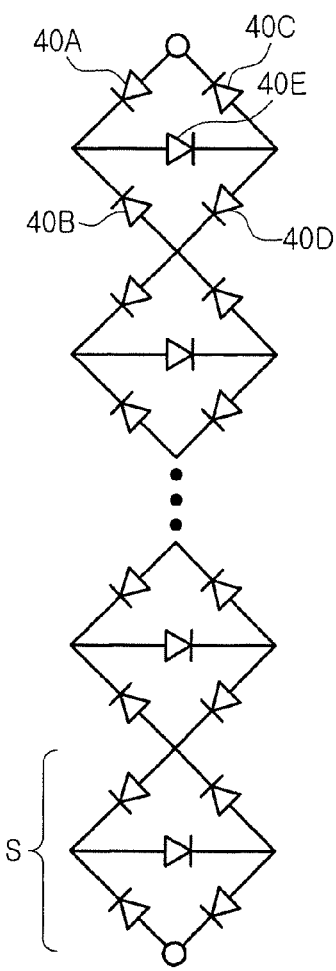
Figure 4C:
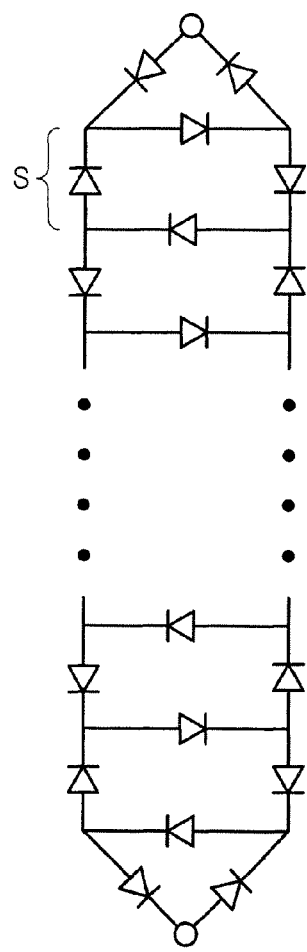

First, FIGS. 4A to 4C illustrate LED driving circuits according to a conventional example and according to an exemplary embodiment of the invention.

The LED driving circuit shown in FIG. 4A is a reverse-parallel circuit structure for general AC driving in which LED devices 30A and 30B arranged in reverse parallel are connected in series to each other to define a plurality of stacks S. As shown in Table 1, despite an overall increase in the number of stacks, a ratio of the number of continuously driven LEDs to the number of employed LEDs, i.e., utilization efficiency of LEDs is 50%.

The LED driving circuit shown in FIG. 4B is a bridge circuit structure in which each LED device is located in each branch. One stack includes all five LED devices 40A, 40B, 40C, 40D, and 40E and the plurality of stacks maybe formed to ensure desired output. As noted in Table 1, this bridge network LED circuit has a utilization efficiency of 60% regardless of the number of the stacks. This is attainable because unlike the reverse-parallel arrangement of FIG. 4A, the LED devices 40E located in the middle branch can be driven continuously in a bi-direction.

In the same manner as FIG. 2A, the ladder network LED driving circuit shown in FIG. 4C includes a total of eight LEDs to define two stacks. Five LEDs are continuously driven to ensure a high utilization efficiency of 62.5%. Also, as noted in Table 1, the ladder network LED driving circuit is configured such that with a greater number of the stacks, a greater number of LEDs are driven in a bi-direction. This accordingly leads to a gradual increase in utilization efficiency of the LEDs.

TABLE 1

| Number of stacks | Reverse parallel network | | | | Bridge network | | | | Ladder network | | | |
|---|---|---|---|---|---|---|---|---|---|---|---|---|
| | $V_f$ | Number of LEDs | Number of turns-on in bi-direction | Efficiency (%) | $V_f$ | Number of LEDs | Number of turns-on in bi-direction | Efficiency (%) | $V_f$ | Number of LEDs | Number of turns-on in bi-direction | Efficiency (%) |
| 1 | $\Delta V_f$ | 2 | 0 | 50 | $3 \cdot \Delta V_f$ | 5 | 1 | 60 | $5 \cdot \Delta V_f$ | 8 | 2 | 62.5 |
| 2 | $2 \cdot \Delta V_f$ | 4 | 0 | 50 | $6 \cdot \Delta V_f$ | 10 | 2 | 60 | $7 \cdot \Delta V_f$ | 11 | 3 | 63.6 |
| 3 | $3 \cdot \Delta V_f$ | 6 | 0 | 50 | $9 \cdot \Delta V_f$ | 15 | 3 | 60 | $9 \cdot \Delta V_f$ | 14 | 4 | 64.3 |
| 4 | $5 \cdot \Delta V_f$ | 8 | 0 | 50 | $12 \cdot \Delta V_f$ | 20 | 4 | 60 | $11 \cdot \Delta V_f$ | 17 | 5 | 64.7 |
| 5 | $5 \cdot \Delta V_f$ | 10 | 0 | 50 | $15 \cdot \Delta V_f$ | 25 | 5 | 60 | $13 \cdot \Delta V_f$ | 20 | 6 | 65 |
| 6 | $6 \cdot \Delta V_f$ | 12 | 0 | 50 | $18 \cdot \Delta V_f$ | 30 | 6 | 60 | $15 \cdot \Delta V_f$ | 23 | 7 | 65.2 |
| 7 | $7 \cdot \Delta V_f$ | 14 | 0 | 50 | $21 \cdot \Delta V_f$ | 35 | 7 | 60 | $17 \cdot \Delta V_f$ | 26 | 8 | 65.4 |
| 8 | $8 \cdot \Delta V_f$ | 16 | 0 | 50 | $24 \cdot \Delta V_f$ | 40 | 8 | 60 | $19 \cdot \Delta V_f$ | 29 | 9 | 65.5 |
| 9 | $9 \cdot \Delta V_f$ | 18 | 0 | 50 | $27 \cdot \Delta V_f$ | 45 | 9 | 60 | $21 \cdot \Delta V_f$ | 32 | 10 | 65.6 |
| 10 | $10 \cdot \Delta V_f$ | 20 | 0 | 50 | $30 \cdot \Delta V_f$ | 50 | 10 | 60 | $23 \cdot \Delta V_f$ | 35 | 11 | 65.7 |
| 21 | $21 \cdot \Delta V_f$ | 42 | 0 | 50 | $63 \cdot \Delta V_f$ | 105 | 21 | 60 | $45 \cdot \Delta V_f$ | 68 | 22 | 66.2 |
| 30 | $30 \cdot \Delta V_f$ | 60 | 0 | 50 | $90 \cdot \Delta V_f$ | 150 | 30 | 60 | $63 \cdot \Delta V_f$ | 95 | 31 | 66.3 |
| 63 | $63 \cdot \Delta V_f$ | 126 | 0 | 50 | — | — | — | — | — | — | — | — |

Therefore, in case of requiring an output of nine LED devices, the reverse-parallel LED circuit shown in FIG. 4A requires a total of eighteen LED devices and the bridge network LED circuit requires a total of fifteen LED devices to define three stacks. Meanwhile, in the ladder network LED circuit according to the present invention, a total fourteen LEDs are connected to define three stacks, thereby providing desired light amount (nine LED devices). This leads to a considerable decrease in the number of LED devices employed over the bridge LED circuit.

This improvement is further achieved in the circuit with a bigger output. That is, in case of requiring an output of sixty three LED devices, the reverse-parallel circuit and the bridge circuit requires one hundred twenty six and one hundred five LED devices, respectively to enable AC driving circuit. However, the ladder network LED circuit requires only ninety five LED devices, thereby reducing the number of the LED devices by 31 and 10, respectively, over the conventional circuit.

This is because in the bridge LED circuit, at least two LED devices are located in a current loop between the LEDs commonly driven in a bi-direction. Meanwhile, in the ladder network, at least one LED device is required between the LED devices commonly utilized. That is, the ladder network circuit requires a less number of LEDs between the LEDs commonly utilized in a bi-direction than the bridge network circuit. This allows the ladder network to commonly utilize a greater overall number of LEDs in a bi-direction than the bridge structure.

Figure 5A:
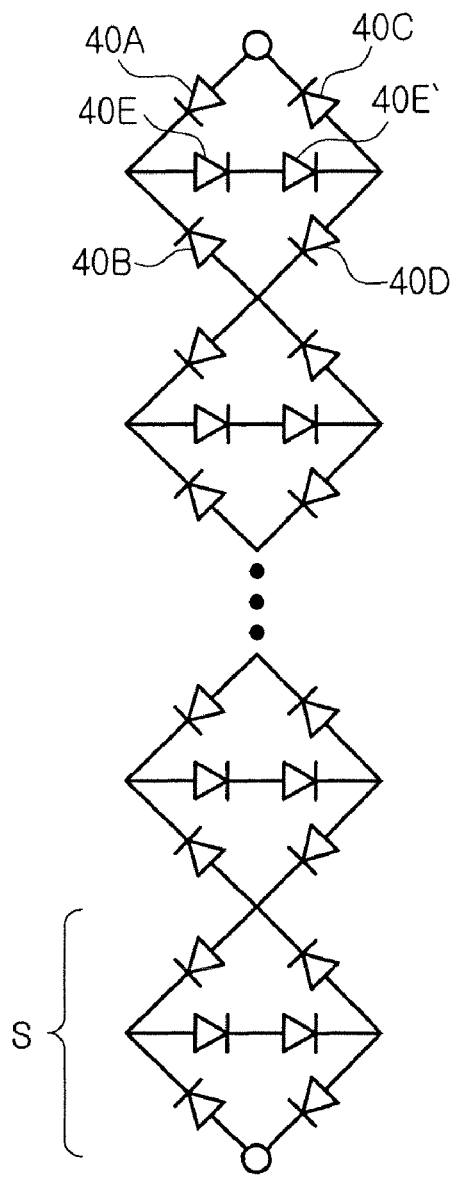
FIGS. 5A to 5B illustrate LED driving circuits according to another conventional example and according to another exemplary embodiment of the invention.
Figure 5B:
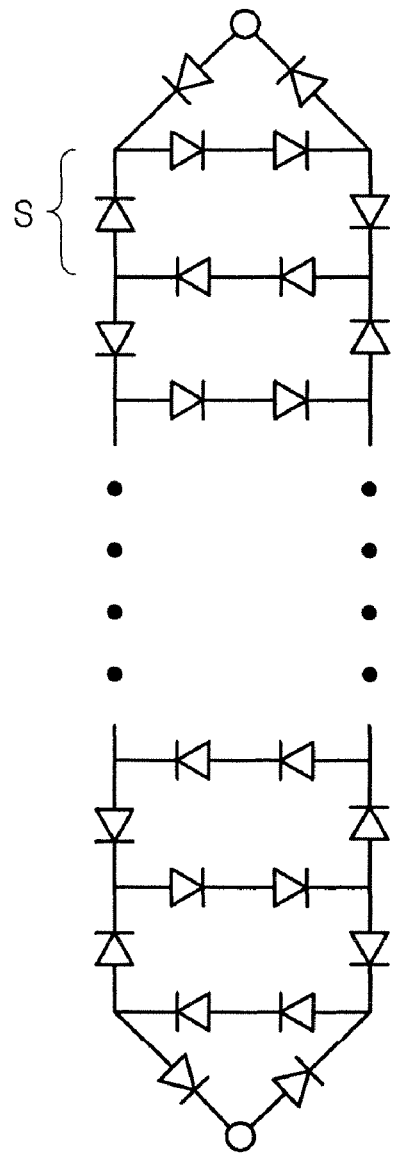

FIGS. 5A to 5B illustrate LED driving circuits according to another conventional example and according to another exemplary embodiment of the invention.

The driving circuits of FIGS. 5A and 5B are similar to those of FIGS. 4B and 4C but configured such that two LED devices are located in each of middle branches to be connected in series to each other. That is, the number of continuously driven LED devices is increased to an equal level in each of stacks. The ladder network LED driving circuit shown in FIG. 5B will be understood with reference to the embodiment shown in FIG. 2B.

Therefore, in case of requiring an output of sixteen LED devices, the reverse-parallel LED circuit shown in FIG. 4A requires a total thirty two LED devices, and the bridge network LED circuit shown in FIG. 5A requires a total twenty four LED devices to define four stacks. Meanwhile, in the ladder network LED circuit of the present invention, a total twenty two LED devices are required to provide desired light amount (sixteen LED devices). This leads to considerable reduction in the number of the LED devices employed over the bridge LED circuit.

This improvement is further achieved in the circuit with a bigger output. That is, in case of requiring an output of fifty two LED devices, the reverse-parallel circuit and the bridge circuit require one hundred four and seventy eight LED devices, respectively to enable AC driving circuit. However, the ladder network LED circuit requires only seventy LED devices, thereby reducing the number of the LED devices by 34 and 8, respectively over the conventional circuit.

As described above, the ladder network LED driving circuit requires a much smaller number of LED devices fore AC driving to achieve identical output than the conventional reverse-parallel structure and the bridge structure as well.

As set forth above, according to exemplary embodiments of the invention, a novel LED driving circuit adopts a ladder network principle to increase a ratio of the number of continuously driven LED devices to a total number of employed LED devices. This leads to relative decrease in the number of LED devices employed to achieve equal output and subsequently improvement in overall efficiency of the circuit. Also, an LED array apparatus including the LED driving circuit can be configured.

While the present invention has been shown and described in connection with the exemplary embodiments, it will be apparent to those skilled in the art that modifications and variations can be made without departing from the spirit and scope of the invention as defined by the appended claims.

What is claimed is:

1. An AC driven light emitting device comprising:
a plurality of first LEDs, each having a first polarity and a second polarity, linearly connected by (n) number of first middle junction points, in which the same polarities of adjacent first LEDs are connected each other, where n denotes an integer satisfying n>2;
a plurality of second LEDs, each having a first polarity and a second polarity, linearly connected by (n) number of second middle junction points, in which the same polarities of adjacent second LEDs are connected each other;
a first junction point in which different polarities of a first LED of the plurality of first LEDs and a first LED of the plurality of second LEDs are connected each other;

TABLE 2

| | Reverse parallel network | | | | Bridge network | | | | Ladder network | | | |
|---|---|---|---|---|---|---|---|---|---|---|---|---|
| Number of stacks | $V_f$ | Number of LEDs | Number of turns-on in bi-direction | Efficiency (%) | $V_f$ | Number of LEDs | Number of turns-on in bi-direction | Efficiency (%) | $V_f$ | Number of LEDs | Number of turns-on in bi-direction | Efficiency (%) |
| 1 | $\Delta V_f$ | 2 | 0 | 50 | $4 \cdot \Delta V_f$ | 6 | 2 | 66.7 | $7 \cdot \Delta V_f$ | 10 | 4 | 70 |
| 2 | $2 \cdot \Delta V_f$ | 4 | 0 | 50 | $8 \cdot \Delta V_f$ | 12 | 4 | 66.7 | $10 \cdot \Delta V_f$ | 14 | 6 | 71.4 |
| 3 | $3 \cdot \Delta V_f$ | 6 | 0 | 50 | $12 \cdot \Delta V_f$ | 18 | 6 | 66.7 | $13 \cdot \Delta V_f$ | 18 | 8 | 72 |
| 4 | $5 \cdot \Delta V_f$ | 8 | 0 | 50 | $16 \cdot \Delta V_f$ | 24 | 8 | 66.7 | $16 \cdot \Delta V_f$ | 22 | 10 | 72.7 |
| 5 | $5 \cdot \Delta V_f$ | 10 | 0 | 50 | $20 \cdot \Delta V_f$ | 30 | 10 | 66.7 | $19 \cdot \Delta V_f$ | 26 | 12 | 73.1 |
| 6 | $6 \cdot \Delta V_f$ | 12 | 0 | 50 | $24 \cdot \Delta V_f$ | 36 | 12 | 66.7 | $22 \cdot \Delta V_f$ | 30 | 14 | 73.3 |
| 7 | $7 \cdot \Delta V_f$ | 14 | 0 | 50 | $28 \cdot \Delta V_f$ | 42 | 14 | 66.7 | $25 \cdot \Delta V_f$ | 34 | 16 | 73.5 |
| 8 | $8 \cdot \Delta V_f$ | 16 | 0 | 50 | $32 \cdot \Delta V_f$ | 48 | 16 | 66.7 | $28 \cdot \Delta V_f$ | 38 | 18 | 73.7 |
| 9 | $9 \cdot \Delta V_f$ | 18 | 0 | 50 | $36 \cdot \Delta V_f$ | 54 | 18 | 66.7 | $31 \cdot \Delta V_f$ | 42 | 20 | 73.8 |
| 10 | $10 \cdot \Delta V_f$ | 20 | 0 | 50 | $40 \cdot \Delta V_f$ | 60 | 20 | 66.7 | $34 \cdot \Delta V_f$ | 46 | 22 | 73.9 |
| 13 | $13 \cdot \Delta V_f$ | 26 | 0 | 50 | $52 \cdot \Delta V_f$ | 78 | 26 | 66.7 | $43 \cdot \Delta V_f$ | 58 | 28 | 74 |
| 16 | $16 \cdot \Delta V_f$ | 32 | 0 | 50 | $64 \cdot \Delta V_f$ | 96 | 32 | 66.7 | $52 \cdot \Delta V_f$ | 70 | 34 | 74.3 |
| 52 | $52 \cdot \Delta V_f$ | 104 | 0 | 50 | — | — | — | — | — | — | — | — | a second junction point in which different polarities of a last LED of the plurality of first LEDs and a last LED of the plurality of second LEDs are connected each other; and a plurality of third LEDs, each having a first polarity and a second polarity, connected between the first and second middle junction points in the same order such that the associated polarities of the plurality of third LEDs are connected to the first and second middle junction points having the different polarities, wherein upon applying an alternating voltage between the first and second junction points, the first and second LEDs are driven in a half cycle of the alternating voltage and the third LEDs are driven in an entire cycle of the alternating voltage.

2. The AC driven light emitting device of claim 1, wherein the first and second LEDs are arranged such that single LED is disposed between the adjacent middle junction points.

3. The AC driven light emitting device of claim 1, wherein the first and second LEDs are arranged such that at least two LEDs are connected in series between the adjacent middle junction points.

4. The AC driven light emitting device of claim 1, wherein the third LEDs are arranged such that at least two LEDs are connected in series between the first and second middle junction points.

5. A lighting apparatus comprising the AC driven light emitting device of claim 1.

* * * * *